No. 649,476. Patented May 15, 1900.
T. C. PROUTY.
HYDRAULIC COUPLING.
(Application filed Aug. 15, 1899.)
(No Model.) 2 Sheets—Sheet 1.
-FIG I-
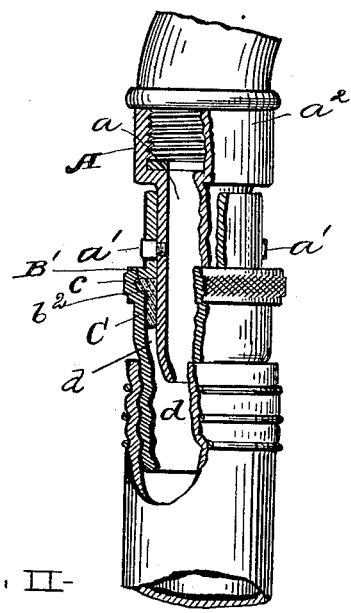
-FIG. II-
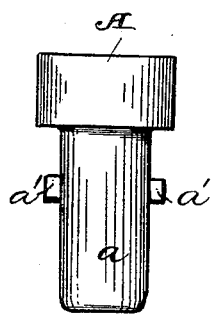
-FIG. III-
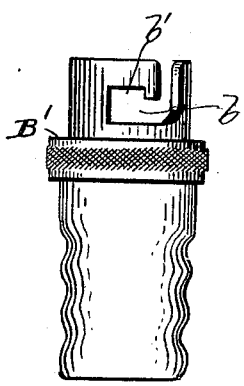
Witnesses,
J. C. Turner
W. E. Merkel
Inventor,
T. C. Prouty
By J. D. Fay Atty.

No. 649,476. Patented May 15, 1900.
T. C. PROUTY.
HYDRAULIC COUPLING.
(Application filed Aug. 15, 1899.)
(No Model.) 2 Sheets—Sheet 2.
- FIG. IV -
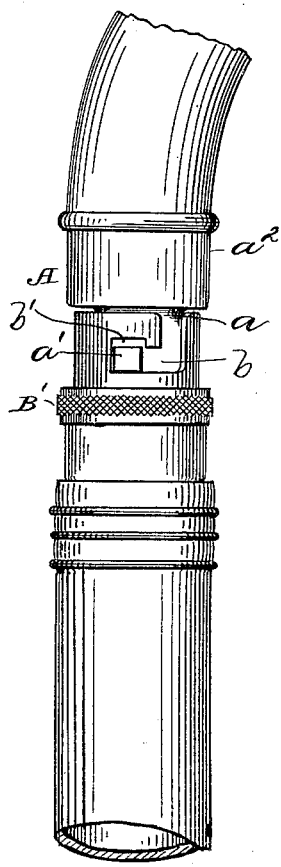
- FIG. V -
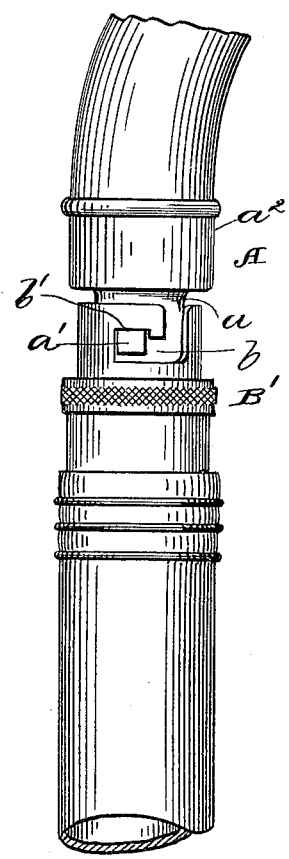
Witnesses,
J. C. Turner
N. E. Merkel
Inventor,
T. C. Prouty
By J. B. Fay
Atty.

UNITED STATES PATENT OFFICE.

THEODORE C. PROUTY, OF MIDLAND, MICHIGAN.

HYDRAULIC COUPLING.

SPECIFICATION forming part of Letters Patent No. 649,476, dated May 15, 1900.

Application filed August 15, 1899. Serial No. 727,255. (No model.)

*To all whom it may concern:*

Be it known that I, THEODORE C. PROUTY, a citizen of the United States, and a resident of Midland, county of Midland, and State of Michigan, have invented a new and useful Improvement in Hydraulic Couplings, of which the following is a specification, the principle of the invention being herein explained and the best mode in which I have contemplated applying that principle so as to distinguish it from other inventions.

The object of my invention is to provide an effective self-sealing coupling for connecting the ends of hose or other pipe; and it consists of means hereinafter fully described.

The annexed drawings and the following description set forth in detail certain mechanism embodying the invention, such disclosed means constituting but one of various forms in which the principle of the invention may be used.

In said annexed drawings, Figure I represents a partial sectional view of my improved coupling and a portion of two hose or other pipe to which the respective members of said coupling are secured, illustrating the parts when coupled together. Fig. II represents an elevation of the male member of my improved coupling detached from the hose or pipe. Fig. III represents a similar view of the female member similarly detached. Fig. IV represents an elevational view of the said coupling, illustrating the position of the two members before the fluid is permitted to pass through; and Fig. V represents a similar view showing the relative positions of the two coupling members during the flow of fluid under pressure through the coupling.

The male member A is provided with a nipple $a$, on which are formed or secured two lugs $a'$, together with a suitable portion $a^2$, which may be secured to the desired water connection. The female member is provided with two slots $b$ of angular formation, which are adapted to receive the lugs $a'$ of the male member, and thereby secure the two members against longitudinal displacement, as is readily understood. Each of said slots $b$ is formed with a recessed portion $b'$ in the direction of the axis of the coupling, thereby causing the width of the slot at such portion to be slightly greater than the width of the lug $a'$. The female member is provided with a shoulder $b^2$, upon which rests the flange $c$ of a tubular packing-ring C entirely within said female member, Fig. I, said flange being secured on said shoulder by means of a threaded gland-nut B'. Said packing-ring is located coaxially with the female member and is of inner diameter substantially equal to the outer diameter of the nipple $a$. When the two members are joined as shown in Fig. I, the said nipple projects through the packing-ring into the female member and forms an annular open space $d$, which is in direct communication with the fluid-duct, and hence permits the end surface of the tubular portion of said packing to also be in direct communication with or to form a part of the walls of the duct. The fluid under pressure in attempting to pass through the joint formed by this connection by way of the tubular packing forces itself between the cylindrical surfaces of said packing and the contiguous surfaces of the male and female members, respectively. Such passage is not prevented at that surface contiguous to the male member, but is prevented at the contiguous female surface by the gland-nut B', said nut sealing the end of said packing, as is readily understood. The packing is thereby forced securely against the male member, thereby securely sealing the joint and preventing absolutely any escape of the fluid through the joint. When the two members are coupled and joined as shown in Fig. IV and the fluid under pressure is not passing through the connection thus made, it is seen that the lugs $a'$ may be caused to rest against the extreme surface of the slots; but upon the admission of the fluid under pressure and the consequent pressure exerted in the direction of the coupling-axis the two members are caused to separate slightly, thereby inserting the lugs $a'$ in the depressions $b'$, as shown in Fig. V, thereby locking the two members against rotative movement.

The above construction permits the diameter of the packing to be slightly greater than the diameter of the male member, thereby permitting the latter to be easily inserted even in cases where obstructions in the form of refuse or other matter may have found their way upon the inner surface of the packing.

Other modes of applying the principle of my invention may be employed instead of the one explained, change being made as regards the mechanism herein disclosed, provided the means covered by either of the following claims be employed.

I therefore particularly point out and distinctly claim as my invention—

1. In a hydraulic coupling, the combination with a male and a female member, of means for securing said two members against longitudinal displacement, said female member provided with a packing-ring of tubular form located entirely within said female member and projecting from the inner surface thereof, said male member provided with a nipple of an outer diameter substantially equal to the inner diameter of said packing and adapted to project into said female member and through said packing, substantially as set forth.

2. In a hydraulic coupling, the combination with a male and a female member, of means for securing said two members against longitudinal displacement, said female member provided with a packing-ring of tubular formation located entirely within and coaxial with said member and formed with a flange, said male member provided with a nipple of an outer diameter substantially equal to the inner diameter of said packing-ring and adapted to project through said female member, the latter member provided with an interior shoulder; and a gland-nut, said packing-ring flange secured between said nut and shoulder and the tubular portion of said ring projecting between and along contiguous surfaces of the male and female members, substantially as set forth.

Signed by me this 1st day of August, 1899.

THEODORE C. PROUTY.

Attest:
J. C. TURNER,
A. E. MERKEL.